United States Patent [19]

Nagaoka et al.

[11] Patent Number: 4,954,861
[45] Date of Patent: Sep. 4, 1990

[54] METHOD OF DRIVING MULTIPLE FLASH RANGEFINDER

[75] Inventors: Shinji Nagaoka; Michio Kawai; Koji Sato, all of Chiba, Japan

[73] Assignee: Seikosha Co., Ltd., Tokyo, Japan

[21] Appl. No.: 355,596

[22] Filed: May 22, 1989

[30] Foreign Application Priority Data

May 25, 1988 [JP] Japan .................................. 63-127520

[51] Int. Cl.$^5$ ........................... G03B 3/00; G01C 3/08
[52] U.S. Cl. .......................................... 354/403; 356/1; 356/4
[58] Field of Search ......................... 354/403; 356/1, 4

[56] References Cited

U.S. PATENT DOCUMENTS 4,688,919  8/1987  Ogawa et al. ........................ 354/403
4,733,062  3/1988  Horikawa ........................ 354/403 X

*Primary Examiner*—W. B. Perkey
*Attorney, Agent, or Firm*—Jordan and Hamburg

[57] ABSTRACT

A method of driving the light-emitting devices of a multiple flash rangefinder for use in an autofocus camera in which the rangefinder includes a light-receiving device and an arithmetic processing unit that calculates the distance to the subject from the output signal from the light-receiving device. The light-emitting devices are lit up successively one at a time in such a way that each device emits momentarily and the series of operations is repeated several times.

6 Claims, 2 Drawing Sheets

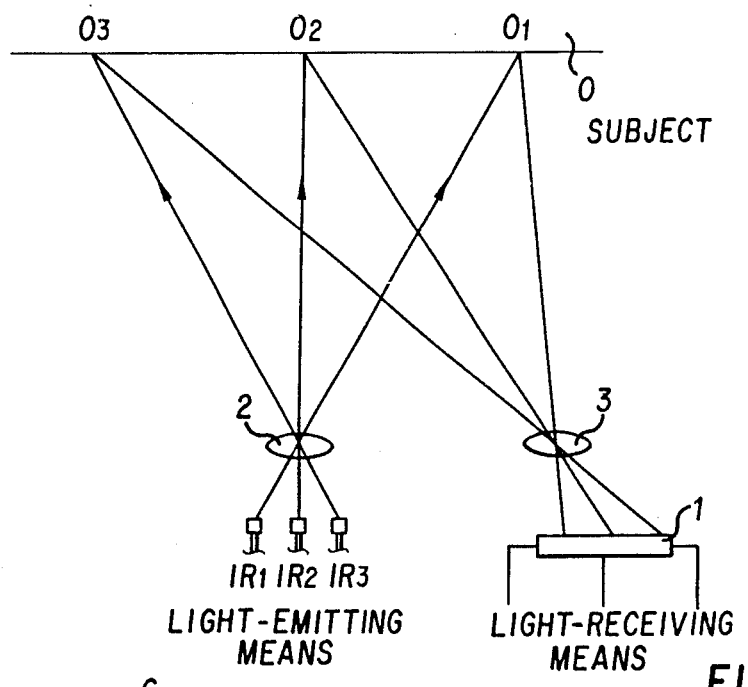
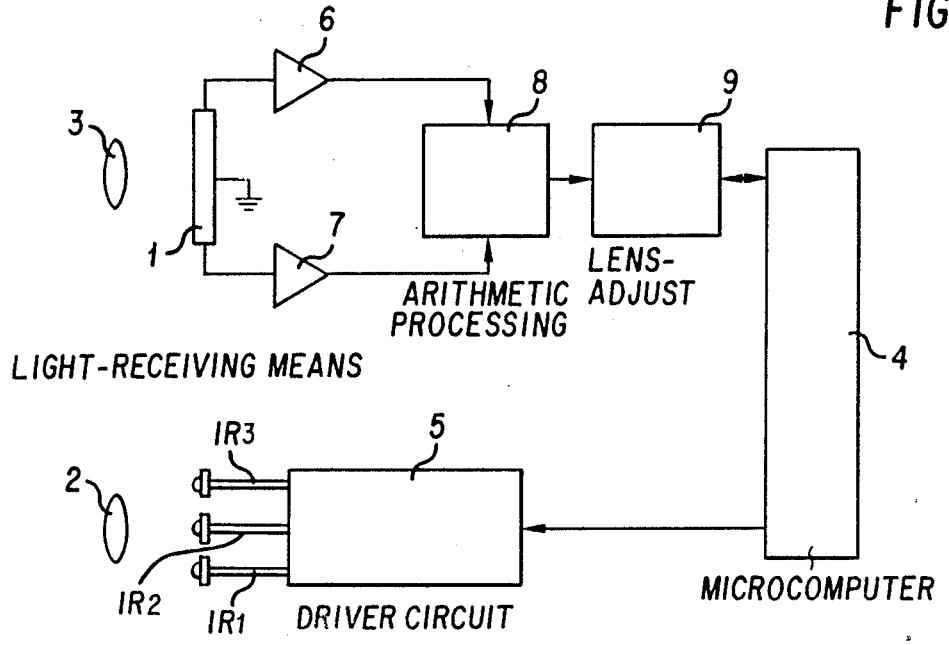
FIG. 1
FIG. 2

METHOD OF DRIVING MULTIPLE FLASH RANGEFINDER

FIELD OF THE INVENTION

The present invention relates to a method of driving a multiple flash rangefinder that is used in an autofocus camera or in a distance-determining device and which emits plural flashes to a subject and calculates the distance to the subject from the position at which reflected light is received.

BACKGROUND OF THE INVENTION

Autofocus cameras equipped with a rangefinder employing multiple flashes are known. Such a rangefinder comprises a plurality of light-emitting means emitting light to the subject, a light-receiving means that receives the light reflected from the subject for position detection, and an arithmetic processing unit which receives the output signal from the light-receiving means and calculates the distance to the subject.

The above-described rangefinder emits light in the following manner. The light-emitting means are activated by a driver circuit to emit a plurality of flashes successively during periods of time of $t_{11}$, $t_{12}$, $t_{13}$, respectively, as shown in FIG. 4. The light-emitting means can be LEDs emitting infrared radiation which is passed through a single projector lens before falling on the subject. The reflected light is focused onto a position-sensitive photodiode. The arithmetic processing unit computes the distance to the subject from the focused position. Then, the focal distance of the lens is automatically adjusted.

In the aforementioned conventional method of driving the multiple flash rangefinder, the sum of the periods during which the infrared LEDs emit light, i.e., $t_{11}+t_{12}+t_{13}$, is long and so a long time is taken to measure the distance. In addition, the LEDs produce a large amount of heat and, therefore, the peak current available is limited. Hence, a limitation is imposed on the light emission power. Consequently, the accuracy with which long distances are measured cannot be improved satisfactorily.

SUMMARY OF THE INVENTION

Accordingly, it is an object of the invention to provide a method of driving a multiple flash rangefinder in such a way that the light-emitting means produce less heat than conventional and long distances can be measured with improved accuracy in a short time.

In one feature of the invention, the plural light-emitting means of the multiple flash rangefinder are successively lit up such that each light-emitting means emits light momentarily and only one light-emitting means emits at a time. This series of emissions is repeated several times.

Other objects and features of the invention will become apparent from the reading of the following specification.

BRIEF DESCRIPTION OF THE DRAWINGS

FIG. 1 is a diagram illustrating the operating principle of a method according to the invention;

FIG. 2 is a circuit diagram of a multiple flash rangefinder driven in accordance with the invention;

DETAILED DESCRIPTION OF THE INVENTION

Figure 3:
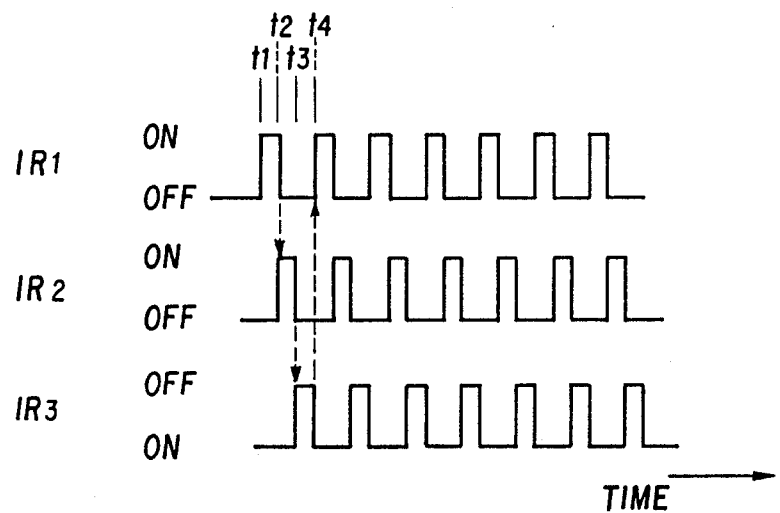
FIG. 3 is a timing diagram of the waveforms of flashes emitted by the light-emitting means shown in FIG. 2.
Figure 4:
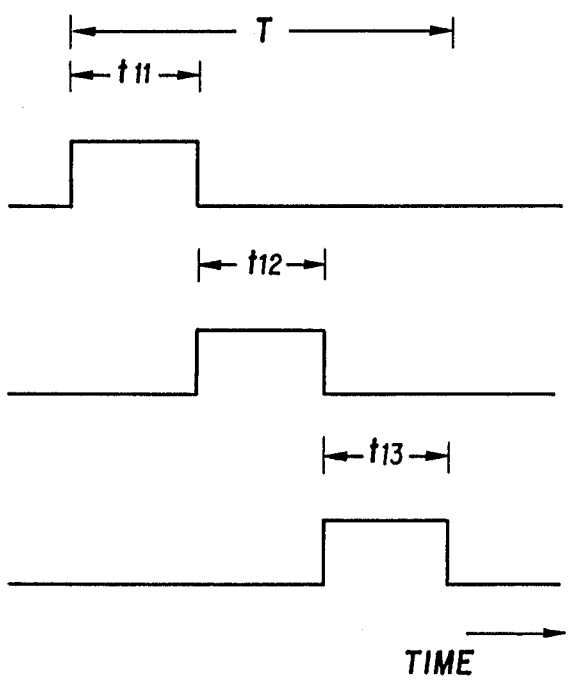
FIG. 4 is a timing diagram of the waveforms of pulses produced by means of the light-emitting means of a multiple flash rangefinder by a conventional method.

Referring to FIG. 1, three light-emitting devices $IR_1$, $IR_2$, $IR_3$ forming light-emitting means and a light-receiving device 1 are mounted on the front surface of a camera. The light-emitting devices consist of LEDs, for example, which emit infrared radiation to the subject O. The light-receiving device 1 constitutes a light-receiving means for position detection and receives the light reflected from the subject. As an example, the light-receiving device 1 consists of a position-sensitive photodetector and is located at a certain distance from the light-emitting devices $IR_1$, $IR_2$, and $IR_3$. These three light-emitting devices emit light successively in such a way that each device emits momentarily and that only one device emits at a time. The light rays emanating from the light-emitting devices $IR_1$, $IR_2$, $IR_3$ pass through a projecting condenser lens 2 and reach the subject O, forming light spots $O_1$, $O_2$, $O_3$, respectively.

The light reflected from the subject O is concentrated by a condenser lens 3 and impinge on the light-receiving device 1. Since the condenser lens 2 in the sending path is equivalent to the condenser lens 3 in the returning path, the light is focused onto the light-receiving device 1 at one point.

In this way, the light reflected by the subject O is collimated into a fine pencil by the condenser lens 3 and received by the light-receiving device 1, which converts the position of the spot light associated with the distance to the subject O into an electrical signal. An autofocus control system which receives the output from the light-receiving device 1 and calculates the distance to the subject is connected to the light-receiving device 1. As shown in FIG. 2, this control system comprises a microcomputer 4, a driver circuit 5 for energizing the light-emitting devices $IR_1$, $IR_2$, $IR_3$ according to the signal from the microcomputer 4, amplifier circuits 6, 7, an arithmetic processing unit 8, and a lens-adjusting device 9. The processing unit 8 is connected with the light-receiving device 1 via the amplifier circuits 6 and 7. The lens-adjusting device 9 is connected with the processing unit 8.

The three light-emitting devices $IR_1$, $IR_2$, $IR_3$ are successively lit up during periods of time $t_2-t_1$, $t_3-t_2$, $t_4-t_3$, respectively, as shown in FIG. 3 in such a manner that each device emits momentarily and that only one device emits at a time. This series of emissions is repeated several times. More specifically, the light-emitting device $IR_1$ emits between instant of time $t_1$ and instant of time $t_2$. At this time, the arithmetic processing unit 8 calculates the distance to the subject. Then, the light-emitting device $IR_2$ emits between instant $t_2$ and instant $t_3$. The processing unit computes the distance in a like manner. The light-emitting device $IR_3$ radiates between instant $t_3$ and instant $t_4$. Similarly, the processing unit calculates the distance.

This series of emissions is repeated several times. Therefore, after the device $IR_3$ emits, the device $IR_1$ is caused to radiate, and the distance is computed. Thus, the device $IR_1$ does not operate between instant $t_2$ and instant $t_4$. The device $IR_2$ is not activated between instant $t_3$ and instant $t_1$. The device $IR_3$ does not radiate between instant $t_4$ and instant $t_3$.

Accordingly, each individual light-emitting means can be deactivated for a long time. Hence, the amount of heat generated by the light-emitting means can be suppressed. This enables the peak current to be set to a large value, which increases the light emission power. Consequently, the accuracy with which long distances are measured is enhanced. Furthermore, the total time taken to measure the distances can be shortened.

What we claim is:

1. A method of operating a multiple flash rangefinder of the type having light-emitting means for emitting light to a subject, a light-receiving means receiving the light reflected from the subject and an arithmetic processing unit that receives an output signal from the light-receiving means and calculates the distance to a subject, the method comprising the steps of emitting flashes of light from a plurality of light-emitting means in successive order one at a time, repeating a plurality of times said step of emitting said flashes of light from said plurality of light-emitting means in successive order one at a time and utilizing said light-receiving means and said arithmetic process unit to calculate the distance for each successive and repeated light emission, whereby the repeated emissions provide for minimizing the heat generated by said light-emitting means.

2. A method according to claim 1, wherein said light-emitting means emits infrared radiation.

3. A method according to claim 1, wherein said light-emitting means comprises a light-emitting diode emitting infrared radiation.

4. A method according to claim 1 further comprising the steps of passing the light emitted from said light-emitting device through a condenser lens and passing the light reflected from the subject through another condenser lens.

5. A method of operating a rangefinder to minimize the amount of heat generated and to maximize the accuracy of measurement over long distances, the method comprising the steps of emitting a series of flashes of light from a plurality of light-emitting means in successive order one at a time, projecting said emitted flashes of light from each light-emitting means at a different point of said subject, repeating a plurality of times said step of emitting said series of flashes of light from said plurality of light-emitting means in successive order one at a time, and utilizing light-receiving means and arithmetic processing means for calculating the distance for each successive and repeated light emission, whereby said repeated emissions maximize the deactivation time of each light-emitting means resulting in minimizing the heat generated by said light-emitting means and thereby enabling use of greater peak power to said light-emitting means and enhanced accuracy of measurement over long distances.

6. A multiple flash rangefinder comprising:
a plurality of light-emitting means for emitting light to a subject;
driver means for driving said plurality of light-emitting means to repeatedly emit flashes of light in successive order one at a time with each light-emitting means projecting its emitted flashes of light to a different point of said subject;
light-receiving means for receiving said emitted flashes of light which are reflected by said subject; and
arithmetic processing means for calculating the distance of said rangefinder from said subject for each of said flashes of light received by said light-receiving means.

* * * * *